US012397682B2

United States Patent
Na

(10) Patent No.: US 12,397,682 B2
(45) Date of Patent: Aug. 26, 2025

(54) CONSTRUCTION MACHINE AND OPERATION METHOD

(71) Applicant: HD HYUNDAI INFRACORE CO., LTD., Incheon (KR)

(72) Inventor: Jong Min Na, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 0 days.

(21) Appl. No.: 18/572,947

(22) PCT Filed: Jun. 23, 2022

(86) PCT No.: PCT/KR2022/008924
§ 371 (c)(1),
(2) Date: Dec. 21, 2023

(87) PCT Pub. No.: WO2022/270936
PCT Pub. Date: Dec. 29, 2022

(65) Prior Publication Data
US 2024/0294095 A1    Sep. 5, 2024

(30) Foreign Application Priority Data
Jun. 24, 2021 (KR) .......................... 10-2021-0082572

(51) Int. Cl.
*B60L 58/27* (2019.01)
*B60L 1/00* (2006.01)
(Continued)

(52) U.S. Cl.
CPC .............. *B60L 58/27* (2019.02); *B60L 1/003* (2013.01); *E02F 9/2228* (2013.01);
(Continued)

(58) Field of Classification Search
CPC ...... B60L 58/27; B60L 1/003; B60L 2200/40; B60L 2240/36; B60L 2240/545;
(Continued)

(56) References Cited

U.S. PATENT DOCUMENTS

2011/0270481 A1* 11/2011 Koga ................... B60W 10/26
701/50
2019/0331144 A1* 10/2019 Kim ...................... F15B 21/087

FOREIGN PATENT DOCUMENTS

EP        3061873 A1    8/2016
JP      2000092614 A    3/2000
(Continued)

OTHER PUBLICATIONS

Espace translation of WO 2021 040038 A1 (Year: 2021).*
(Continued)

*Primary Examiner* — Jason D Shanske
*Assistant Examiner* — Scott Lawrence Strickler
(74) *Attorney, Agent, or Firm* — K&L Gates LLP

(57) ABSTRACT

This disclosure relates to a construction machine utilizing battery and hydraulic power and comprising an electronic power unit comprising a battery and an electric motor, a hydraulic pump driven by the electronic power unit and discharging hydraulic fluid, a hydraulic line through which the hydraulic fluid discharged from the hydraulic pump moves, a main control valve installed on the hydraulic line and controlling the supply of the hydraulic fluid to at least one of propulsion devices or various working devices requiring hydraulic power, a bypass cut valve installed downstream of the main control valve on the hydraulic line and configured to open and close the hydraulic line, and a controller initiating a warm-up mode to increase the output of the electronic power unit and open the bypass cut valve.

10 Claims, 3 Drawing Sheets

(51) Int. Cl.
     *E02F 9/22*           (2006.01)
     *E02F 9/24*           (2006.01)
     *F15B 13/04*         (2006.01)

(52) U.S. Cl.
     CPC .............. *E02F 9/2285* (2013.01); *E02F 9/24* (2013.01); *F15B 13/04* (2013.01); *B60L 2200/40* (2013.01); *B60L 2240/36* (2013.01); *B60L 2240/545* (2013.01); *E02F 9/2296* (2013.01)

(58) Field of Classification Search
     CPC ......... E02F 9/2228; E02F 9/2285; E02F 9/24; E02F 9/2296; F15B 13/04
     See application file for complete search history.

(56) References Cited

FOREIGN PATENT DOCUMENTS

| | | | | |
|---|---|---|---|---|
| JP | 2004350443 | A | 12/2004 | |
| KR | 1020110102396 | A | 9/2011 | |
| KR | 1020160175789 | | 12/2016 | |
| KR | 102221165 | | 2/2021 | |
| WO | WO-2021040038 | A1 * | 3/2021 | .............. E02F 3/435 |

OTHER PUBLICATIONS

International Search Report for related International Application No. PCT/KR2022/008924; report dated Dec. 29, 2022; (2 pages).
Written Opinion for related International Application No. PCT/KR2022/008924; report dated Dec. 29, 2022; (4 pages).
Extended European Search Report for related European Application No. 22828783.5; action dated Apr. 29, 2025; (4 pages).

* cited by examiner

CONSTRUCTION MACHINE AND OPERATION METHOD

CROSS-REFERENCE TO RELATED APPLICATIONS

This application is the National Stage filing under 35 U.S.C. 371 of International Application No. PCT/KR2022/008924, filed on Jun. 23, 2022, which claims the benefit of earlier filing date of and right of priority to Korean Application No. 10-2021-0082572 filed on Jun. 24, 2021, the contents of which are all hereby incorporated by reference herein in their entirety.

FIELD

This disclosure relates to a construction machine utilizing battery and hydraulic power and operation method thereof.

BACKGROUND

Construction machines refer to all machines used in civil engineering or building construction projects. Typically, construction machines are equipped with engines, such as diesel engines, to obtain hydraulic power for both propulsion and operational devices, harnessing the engine's power to drive a hydraulic pump and enabling the machine's movement or operation through the force generated by the hydraulic pump.

These construction machines, equipped with diesel engines, have been plagued by high operating costs, attributed not only to the expensive fuel costs caused by the depletion of fossil fuels, particularly diesel, and the pressing need for alternative energy sources but also to the high fuel consumption inherent in the nature of heavy equipment.

To address these drawbacks, research is actively being conducted on construction machines powered by batteries. Construction machines equipped with batteries operate by driving an electric motor using electrical energy generated from the batteries, instead of an engine, to power the hydraulic pump.

SUMMARY

Construction machines relying on battery and hydraulic power face the drawback of experiencing reduced performance in low-temperature conditions, such as winter, when the temperature drops below 0° C.

Specifically, in low-temperature conditions, the output of the battery, which serves as the energy source, is reduced. Moreover, in low-temperature conditions, the viscosity of the hydraulic fluid increases, leading to decreased fluidity, which results in a reduction of the output power generated through the hydraulic pump.

The objective of this disclosure is to prevent the reduction in performance of a construction machine utilizing battery and hydraulic power in low-temperature conditions.

To solve the problems described above, the present disclosure has embodiments with the following features.

According to an embodiment, a construction machine includes an electronic power unit comprising a battery and an electric motor, a hydraulic pump driven by the electronic power unit and discharging hydraulic fluid, a hydraulic line through which the hydraulic fluid discharged from the hydraulic pump moves, a main control valve installed on the hydraulic line and controlling the supply of the hydraulic fluid to at least one of propulsion devices or various working devices requiring hydraulic power, a bypass cut valve installed downstream of the main control valve on the hydraulic line and configured to open and close the hydraulic line, and a controller initiating a warm-up mode to increase output of the electronic power unit and open the bypass cut valve.

The controller initiates the warm-up mode based on temperature of the battery being lower than a first threshold value.

The controller, during the warm-up mode, controls the battery by changing discharge rate of the battery based on the temperature of the battery.

The controller initiates the warm-up mode based on temperature of the hydraulic fluid being lower than or equal to a second threshold value.

The controller, during the warm-up mode, additionally activates a heating device based on the temperature of the hydraulic fluid being lower than or equal to the second threshold value.

The controller initiates the warm-up mode based on a pilot cut-off signal being input from a pilot cut-off lever.

The controller controls the construction machine to generate an alarm based on the pilot cut-off signal being not input.

According to an embodiment, a method for controlling a construction machine including an electronic power unit including a battery and an electric motor, a hydraulic pump driven by the electronic power unit and discharging hydraulic fluid, a hydraulic line through which the hydraulic fluid discharged from the hydraulic pump moves, a main control valve installed on the hydraulic line and controlling the supply of the hydraulic fluid to at least one of propulsion devices or various working devices requiring hydraulic power, a bypass cut valve installed downstream of the main control valve on the hydraulic line and configured to open and close the hydraulic line, and an oil tank storing the hydraulic fluid to be supplied to the hydraulic pump and recovering the hydraulic fluid discharged by the hydraulic pump and moved along the hydraulic line, includes initiating a warm-up mode to increase output of the electronic power unit and open the bypass cut valve.

The initiating of the warm-up mode includes initiating the warm-up mode based on temperature of the battery being lower than a first threshold value.

The initiating of the warm-up mode includes controlling the battery by changing discharge rate of the battery based on the temperature conditions of the battery.

The initiating of the warm-up mode includes initiating the warm-up mode based on temperature of the hydraulic fluid being lower than or equal to a second threshold value.

The initiating of the warm-up mode includes activating a heating device additionally based on the temperature of the hydraulic fluid being lower than or equal to the second threshold value.

The initiating of the warm-up mode includes initiating the warm-up mode based on a pilot cut-off signal being input from the pilot cut-off lever.

The initiating of the warm-up mode includes controlling the construction machine to generate an alarm based on the pilot cut-off signal being not input.

The present disclosure is advantageous in terms of prevent the reduction in performance of a construction machine utilizing battery and hydraulic power in low-temperature conditions.

DETAILED DESCRIPTION

Figure 1:
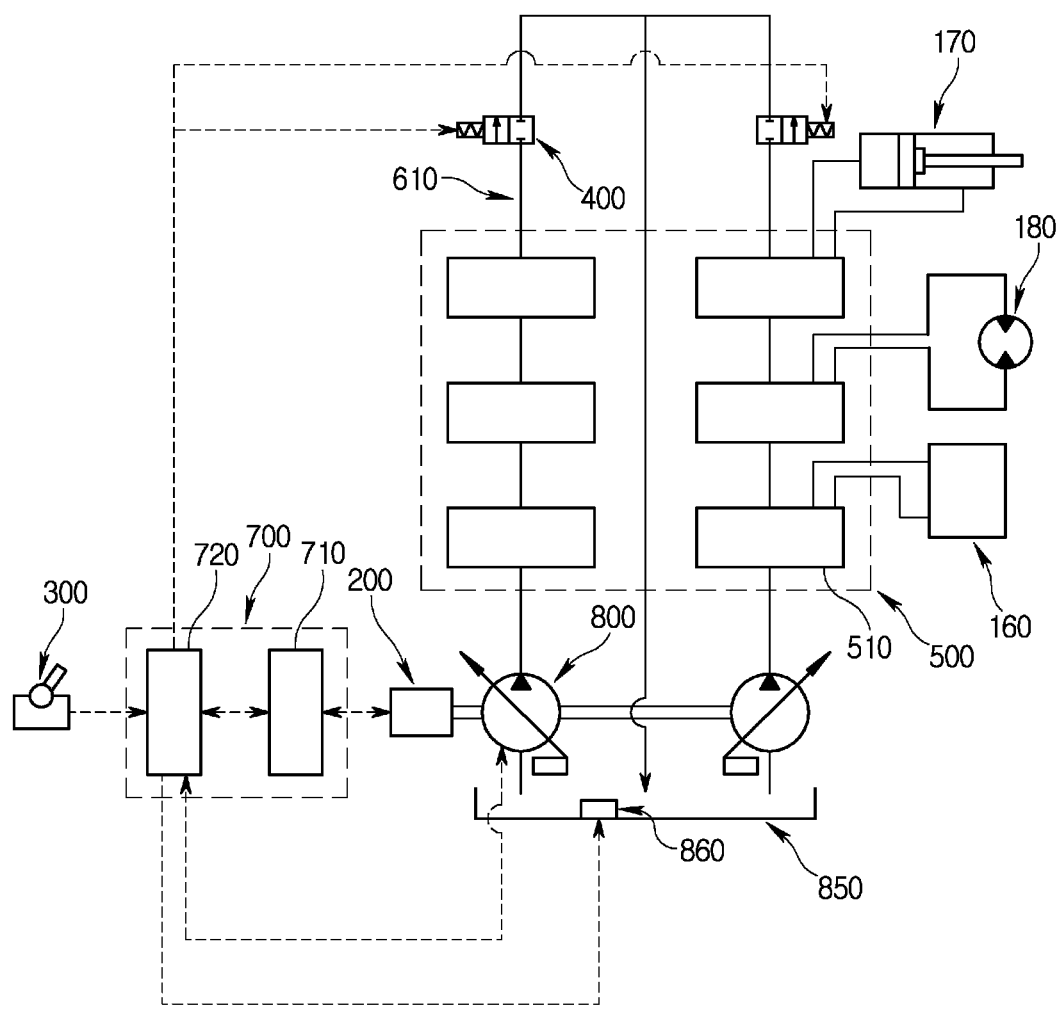
FIG. 1 is a configuration diagram of a construction machine according to an embodiment.

Hereinafter, embodiments of the present disclosure will be described with reference to accompanying drawings. In the specification, when a component (or area, layer, part, etc.) is mentioned as being "on top of," "connected to," or "coupled to" another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression "and/or" is taken to include one or more combinations that can be defined by associated components.

The terms "first," "second," etc. are used to describe various components, but the components should not be limited by these terms. The terms are used only for distinguishing one component from another component. For example, a first component may be referred to as a second component and, similarly, the second element may be referred to as the first component, without departing from the scope of the present disclosure. As used herein, the singular forms are intended to include the plural forms as well, unless the context clearly indicates otherwise.

The terms such as "below," "lower," "above," "upper," etc. are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

Hereinafter, a description is made of the construction machine according to an embodiment of the present disclosure with reference to FIG. 1. In an embodiment of the present disclosure, the explanation is made with an excavator as an example of the construction machine. However, the embodiments of the present disclosure are not limited to this example and can be applied to any construction machine that transfers power using hydraulic fluid discharged by a hydraulic pump.

As illustrated in FIG. 1, the construction machine according to an embodiment of the present disclosure includes a hydraulic pump 800, an electronic power unit 200, a hydraulic line 610, an oil tank 850, a main control valve (MCV) 500, a bypass cut valve 400, a pilot cut-off lever 300, and a controller 700.

The construction machine according to an embodiment of the present disclosure may further include various working devices and propulsion devices. The construction machine may also include operating devices such as joysticks, levers, and pedals installed in the operator's cab to allow the operator to operate the various working devices 170 and propulsion devices 160. The pilot cut-off lever 300 may also be one of operating devices within the operating apparatus.

The electronic power unit 200 includes a battery and an electric motor to generate power. The electronic power unit 200 supplies rotational power to the hydraulic pump 800.

The hydraulic pump 800 operates with the power generated by the electronic power unit 200 and discharge hydraulic fluid. The hydraulic fluid discharged from the hydraulic pump 800 is supplied to the propulsion devices 160 including a propulsion motor for travel, a swing moder 180 used for the swing of the upper rotating body, and driving devices including boom cylinders, arm cylinders, bucket cylinders, and optional cylinders used for the various working devices 170. The driving devices are powered by the hydraulic fluid supplied from the hydraulic pump 800.

In an embodiment of the present disclosure, the hydraulic pump 800 may be equipped with an angle sensor (not shown) capable of measuring the swashplate angle and electrically controlled by an electrical signal generated by the controller 700. Here, the information measured by the angle sensor is transmitted to the controller 700. Accordingly, the controller 700 may forcibly adjust the swashplate angle of the hydraulic pump 800 based on the information from the angle sensor. That is, the hydraulic pump 800 may be forcibly operated solely by the electrical signal generated by the controller 700.

The hydraulic line 610 transports the hydraulic fluid discharged from the hydraulic pump 800 to supply the hydraulic fluid to the propulsion device 160, the swing motor 160, and the working devices 170 such as boom cylinders, arm cylinders, bucket cylinders, and optional cylinders.

The oil tank 850 supplies the hydraulic fluid to be discharged by the hydraulic pump 800. The oil tank 850 also recovers the hydraulic fluid that has moved along the hydraulic line 610 from the hydraulic pump 800.

A heating device 860 heats the hydraulic fluid stored in the oil tank 850. For example, the heating device 860 may be an electric heating wire installed inside the oil tank 850.

The main control valve (MCV) 500 is installed on the hydraulic line 610 and controls the supply of hydraulic fluid to one or more of the propulsion devices 160, swing motor 180, or working devices 170 that require hydraulic power. That is, the main control valve 500 distributes the hydraulic fluid discharged by the hydraulic pump 800 to various working devices 170, swing motor 180, and propulsion devices 160, controlling the supply of hydraulic fluid.

In detail, the main control valve 500 includes a plurality of spools 510. Each spool 510 controls the supply of hydraulic fluid to the propulsion devices 160, swing motor 180, and driving devices 170 such as boom cylinders, arm cylinders, bucket cylinders, and optional cylinders.

The main control valve 500 may also include spool caps (not shown) connected to each end of the control spools 510 to control the stroke of the control spools 510 based on the pilot signals received from the operating devices. For example, the spool caps may include electronic proportional pressure reducing valves (EPPRV), and depending on the degree of opening of the electronic proportional pressure reducing valve, the pressure of the pilot signal transmitted to the control spool 510 changes, causing the control spool 510 to move in both directions according to the pressure applied by the pilot signal.

The bypass cut valve 400 is installed downstream of the main control valve 500 on the hydraulic line 610 and is configured to open and close the hydraulic line 610.

When the bypass cut valve 400 is in the closed position, the hydraulic fluid discharged from the hydraulic pump 800 is prevented from flowing through the hydraulic line 610 and returning to the oil tank 850. In detail, the construction machine according to an embodiment includes a hydraulic pump 800 that is electronically controllable to prevent the return of hydraulic fluid when the bypass cut valve 400 is closed, maintaining a constant pressure level of 45 bar in the hydraulic circuit, and ensuring that the hydraulic fluid does not circulate. When the bypass cut valve 400 is switched to the open position, the hydraulic fluid discharged from the hydraulic pump 800 can return to the oil tank 850.

That is, when the bypass cut valve 400 is in the closed position, even though the hydraulic pump 800 is in operation, the flow rate of hydraulic fluid moving along the hydraulic line 610 cannot increase.

The pilot cut-off lever 300 is installed inside the operator's seat of the construction machine, includes a lever and stand connected to each other, and controls whether the construction machine is able to operate. For example, the pilot cut-off lever 300 may be positioned in the first state (on state) to render the construction machine inoperable or in the second state (off state) to allow the construction machine to become operable. The first state may involve the lever being in a position perpendicular to the ground. The second state may involve the lever being in a position parallel to the ground. When the pilot cut-off lever 300 is in the first state, the pilot cut-off signal may be input, and when the pilot cut-off lever 300 is in the second state, the pilot cut-off signal may not be input.

The controller 700 controls various components of the construction machine, such as the electronic power unit 200, main control valve 500, and hydraulic pump 800. The controller 700 may also include at least one of an electronic power unit control device 710 and a vehicle control device 720.

In an embodiment of the present disclosure, the controller 700 may initiate a warm-up mode operation increasing the drive output of the electronic power unit 200 and opening the bypass cut valve 400.

Figure 2:
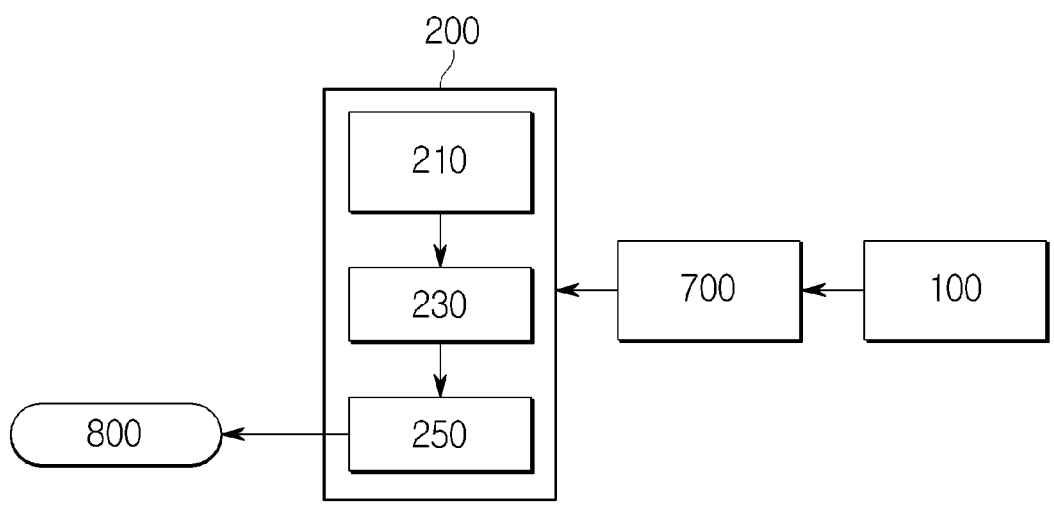
FIG. 2 is a block diagram of an electronic power unit according to an embodiment.

FIG. 2 is a block diagram of an electronic power unit according to an embodiment.

The electronic power unit 200 according to an embodiment includes a battery 210, an inverter 230, and an electric motor 250.

The battery 210 is made of a rechargeable secondary battery. The secondary battery encompasses nickel-metal hydride batteries, lithium-ion batteries, and lithium-polymer batteries. The secondary battery is composed of a positive electrode, a negative electrode, electrolyte, and a separator, and discharge occurs in the process of converting chemical energy into electrical energy. In temperatures below 0° C., the chemical reactions of the battery 210 slow down, resulting in degraded output characteristics and State of Charge (SOC) for the battery 210.

For example, in the case of a lithium-ion battery, electrical flow is generated through the movement of lithium ions between the positive and negative electrodes via the electrolyte, and at lower temperatures, the movement speed of lithium ions decreases. This results in increased internal resistance and reduced voltage in the battery 210. Additionally, at temperatures below 0° C., the liquid electrolyte may freeze.

The inverter 230 converts the direct current voltage from the battery 210 into the three-phase alternating current voltage required for the electric motor's operation and controls the torque of the electric motor 250.

The electric motor 250 is connected to the hydraulic pump 800 and transfers power to the hydraulic pump 800. In detail, the electric motor 250 receives alternating current voltage from the inverter 230 to generate rotational power. The hydraulic pump 800 receives rotational power from the electric motor 250 to generate hydraulic pressure for the hydraulic fluid.

The controller 700 may initiate the construction machine into a warm-up mode based on the temperature of the battery 210 or the hydraulic fluid received from the sensor 100. The controller 700 may increase the output of the electronic power unit 200 in warm-up mode operation.

Figure 3:
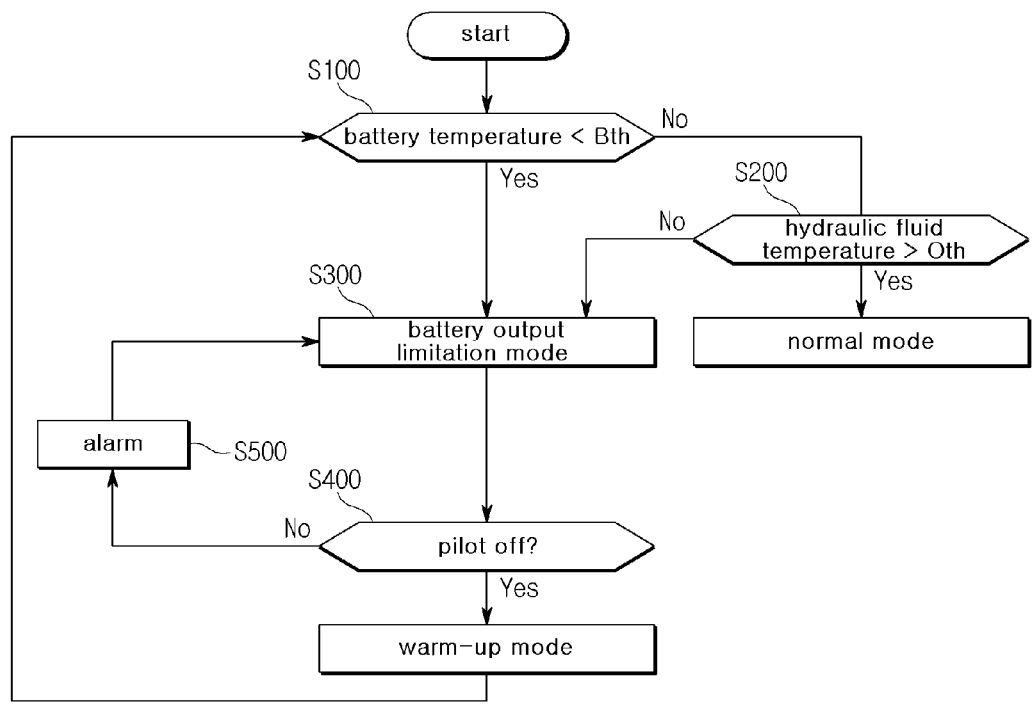
FIG. 3 is a flowchart illustrating a control method of a controller.

FIG. 3 is a flowchart illustrating a control method of a controller.

The controller 700 may operate the construction machine in warm-up mode or normal mode based on the temperature of the battery 210, the temperature of the hydraulic fluid, and the pilot cut-off signal of the pilot cut-off lever. The warm-up mode is an operating mode of the construction machine for preventing the output of the construction machine from being degraded in low-temperature conditions. The controller 700 may increase the output of the electronic power unit 200 and control the bypass cut valve 400 to be open.

Initially, when the construction machine is started, the controller 700 checks the temperature of the battery 210 at step S100. The controller 700 determines whether the temperature of the battery 210 is lower than the first threshold value Bth. The first threshold value Bth may be 0° C. Upon determining that the temperature of the battery 210 is lower than the first threshold value Bth, the controller 700 operates the electronic power unit 200 in battery 210 output limitation mode at step S300. Upon determining that the temperature of the battery 210 is higher than or equal to the first threshold value Bth, the controller 700 determines at step S200 whether the temperature of the hydraulic fluid is higher than a second threshold value Oth.

The controller 700 may check the temperature of the hydraulic fluid. The controller 700 determines whether the temperature of the hydraulic fluid is higher than the second threshold value Oth. The second threshold value Oth may be 40° C. The viscosity of the hydraulic fluid, which varies with temperature, may cause issues with the responsiveness of the drive devices when the temperature is below 40° C. That is, even though the amount of hydraulic fluid discharged by the hydraulic pump is the same, the responsiveness of the driving devices may vary due to the viscosity differences in the hydraulic fluid based on its temperature. Upon determining that the temperature of the hydraulic fluid is lower than or equal to the second threshold value Oth, the controller 700 operates the electronic power unit 200 in the battery output limitation mode at step S200. Upon determining that the temperature of the battery 210 is higher than or equal to the first threshold value Bth, the controller 700 determines at step S200 whether the temperature of the hydraulic fluid is higher than a second threshold value Oth.

Upon determining that the temperature of the hydraulic fluid is lower than or equal to the second threshold value Oth, the controller 700 may operate the heating device 860 additionally to run the warm-up mode. The heating device 860 may be an electric heating wire installed inside the oil tank 850, and the controller may operate the heating device 860 to heat and raise the temperature of the hydraulic fluid stored in the oil tank 850.

In the battery output limitation mode at step S300, the controller 700 may limit the output of the battery 210 to control the output of the electric motor 250 based on the temperature of the battery 210 and the temperature of the hydraulic fluid. In detail, the controller 700 may increase the discharge amount of the battery 210 to raise the temperature of the battery 210 in a state where the battery temperature is lower than the first threshold value Bth. The battery 210 has an internal resistance of tens of milliohms (mΩ), and when discharging begins, self-heating occurs proportionally to the square of the discharge rate (C-rate) according to Joule's law. Therefore, it is possible to raise the temperature of the battery 210. The controller 700 may adjust the output of the battery 210 based on the temperature conditions of the battery 210. For example, the controller 700 may adjust the maximum discharge rate (Max. C-rate) of the battery 210 based on the temperature conditions of the battery 210, as shown in Table 1. The upper limit of the output of the battery 210 at different temperatures may be compiled into a lookup table and included in the internal logic of the battery management system (BMS).

TABLE 1

| Battery temperature (° C.) | Maximum discharge rate (C) |
|---|---|
| −30~−20 | 0.2 |
| −20~−5 | 0.3 |
| >−5 | 0.4 |

The controller 700 may discharge the battery 210 by discharging the charge stored in the battery 210 to an external load. The controller 700 may increase the torque of the electric motor 250 supplied with electrical energy from the battery 210 or increase the rpm of the electric motor 250 to raise the discharge amount of the battery 210. As the torque or rpm of the electric motor 250 increases, the hydraulic pressure generated by the hydraulic pump 800 receiving rotational power from the electric motor 250 increases. As the hydraulic pressure increases, the circulation of hydraulic fluid within the hydraulic lines becomes faster, and the temperature of the hydraulic fluid rises due to friction within the hydraulic lines. In this case, the controller 700 may control to increase the output of the electronic power unit 200 and open the bypass cut valve 400.

Next, the controller 700 determines at step S400 whether the pilot cut-off signal of the pilot cut-off lever 300 is input. The pilot cut-off lever 300, typically installed inside the operator's seat, controls the operability of the construction machine by initiating the input of the pilot cut-off signal in the first state (on state) and terminating the input of the pilot cut-off signal in the second state (off state). When the pilot cut-off lever 300 is in the first state (on state), the pilot cut-off signal is input to the controller 700, rendering the construction machine to inoperable. When the pilot cut-off lever 300 is in the first state (on state), even though the hydraulic pressure generated by the hydraulic pump 800 increases, the propulsion devices 160, swing motor 160, and various working devices 170, such as boom cylinders, arm cylinders, bucket cylinders, and optional cylinders, of the construction machine do not operate, ensuring safety.

Upon determining at step S400 that the pilot cut-off signal is input in the battery output limitation mode (S300), the controller 700 operates the construction machine in warm-up mode.

Upon determining that the pilot cut-off signal is not input, the controller 700 determines that the pilot cut-off signal lever 300 is in the second state (off state) and controls the construction machine to generate an alarm at step S500. For example, the controller 700 may generate an alarm to the operator to operate the pilot cut-off lever 300 to the first state (on state) through the instrument panel of the construction machine. Additionally, the controller 700 may generate an alarm to the operator to operate the pilot cut-off lever 300 to the first state (on state) through a buzzer warning sound or voice.

The controller 700 may check the temperature of the battery 210 in warm-up mode at step S100. Afterward, the controller 700 may switch the construction machine to normal mode or maintain normal operation based on the temperature of the battery 210, the temperature of the hydraulic fluid, and the pilot cut-off signal.

The above-described embodiments should be understood as illustrative and not limiting in all respects. The scope of the present disclosure is determined by the appended claims rather than the specification above, and any modifications or variations derived from the meaning and scope of the claims and their equivalence should be interpreted as included the scope of the claims of the present disclosure.

The invention claimed is:

1. A construction machine comprising:
an electronic power unit comprising a battery and an electric motor;
a hydraulic pump driven by the electronic power unit and discharging hydraulic fluid;
a hydraulic line through which the hydraulic fluid discharged from the hydraulic pump moves;
a main control valve installed on the hydraulic line and controlling the supply of the hydraulic fluid to at least one of propulsion devices or various working devices requiring hydraulic power;
a bypass cut valve installed downstream of the main control valve on the hydraulic line and configured to open and close the hydraulic line; and
a controller initiating a warm-up mode to increase output of the electronic power unit and open the bypass cut valve, wherein the controller:
initiates the warm-up mode based on temperature of the battery being lower than a first threshold value; and
during the warm-up mode, controls the battery by changing a discharge rate of the battery based on the temperature of the battery.

2. The construction machine of claim 1, wherein the controller initiates the warm-up mode based on temperature of the hydraulic fluid being lower than or equal to a second threshold value.

3. The construction machine of claim 2, wherein the controller, during the warm-up mode, additionally activates a heating device based on the temperature of the hydraulic fluid being lower than or equal to the second threshold value.

4. The construction machine of claim 1, wherein the controller initiates the warm-up mode based on a pilot cut-off signal being input from a pilot cut-off lever.

5. The construction machine of claim 4, wherein the controller controls the construction machine to generate an alarm based on the pilot cut-off signal being not input.

6. A method for controlling a construction machine comprising an electronic power unit comprising a battery and an electric motor, a hydraulic pump driven by the electronic power unit and discharging hydraulic fluid, a hydraulic line through which the hydraulic fluid discharged from the hydraulic pump moves, a main control valve installed on the hydraulic line and controlling the supply of the hydraulic fluid to at least one of propulsion devices or various working devices requiring hydraulic power, a bypass cut valve installed downstream of the main control valve on the hydraulic line and configured to open and close the hydraulic line, and an oil tank storing the hydraulic fluid to be supplied to the hydraulic pump and recovering the hydraulic fluid discharged by the hydraulic pump and moved along the hydraulic line, the method comprising initiating a warm-up mode to increase output of the electronic power unit and open the bypass cut valve, wherein the initiating of the warm-up mode comprises:
      initiating the warm-up mode based on temperature of the battery being lower than a first threshold value; and
     controlling the battery by changing a discharge rate of the battery based on the temperature of the battery.

7. The method of claim 6, wherein the initiating of the warm-up mode comprises initiating the warm-up mode based on temperature of the hydraulic fluid being lower than or equal to a second threshold value.

8. The method of claim 7, wherein the initiating of the warm-up mode comprises activating a heating device additionally based on the temperature of the hydraulic fluid being lower than or equal to the second threshold value.

9. The method of claim 6, wherein the initiating of the warm-up mode comprises initiating the warm-up mode based on a pilot cut-off signal being input from a pilot cut-off lever.

10. The method of claim 9, wherein the initiating of the warm-up mode comprises controlling the construction machine to generate an alarm based on the pilot cut-off signal being not input.

* * * * *